United States Patent
Wegner et al.

(10) Patent No.: US 10,127,161 B2
(45) Date of Patent: Nov. 13, 2018

(54) METHOD FOR THE COEXISTENCE OF SOFTWARE HAVING DIFFERENT SAFETY LEVELS IN A MULTICORE PROCESSOR SYSTEM

(71) Applicant: Robert Bosch GmbH, Stuttgart (DE)

(72) Inventors: Peter Wegner, Waiblingen (DE); Jochen Ulrich Haenger, Neckarwestheim (DE); Markus Schweizer, Vaihingen/Enz (DE); Carsten Gebauer, Boeblingen (DE); Bernd Mueller, Leonberg (DE); Thomas Heinz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 14/603,544

(22) Filed: Jan. 23, 2015

(65) Prior Publication Data

US 2015/0212952 A1    Jul. 30, 2015

(30) Foreign Application Priority Data

Jan. 30, 2014   (DE) ........................ 10 2014 201 682

(51) Int. Cl.
| | | |
|---|---|---|
| *G06F 12/00* | (2006.01) | |
| *G06F 12/14* | (2006.01) | |
| *G06F 11/07* | (2006.01) | |
| *G06F 8/656* | (2018.01) | |

(52) U.S. Cl.
CPC .......... *G06F 12/1433* (2013.01); *G06F 8/656* (2018.02); *G06F 11/076* (2013.01); *G06F 11/0724* (2013.01); *G06F 12/1441* (2013.01); *G06F 2201/835* (2013.01)

(58) Field of Classification Search
None
See application file for complete search history.

(56) References Cited

U.S. PATENT DOCUMENTS

| | | | | |
|---|---|---|---|---|
| 6,263,405 | B1* | 7/2001 | Irie ..................... | G06F 12/0815 |
| | | | | 711/140 |
| 7,558,775 | B1* | 7/2009 | Panigrahy ........... | H04L 45/7457 |
| 9,298,914 | B1* | 3/2016 | McCorkendale ..... | G06F 21/552 |
| 2003/0212889 | A1* | 11/2003 | Khieu ..................... | H04L 41/28 |
| | | | | 713/164 |
| 2006/0200481 | A1* | 9/2006 | Goyan .................. | G06F 21/572 |
| 2006/0294519 | A1* | 12/2006 | Hattori ................ | G06F 9/45558 |
| | | | | 718/1 |

(Continued)

*Primary Examiner* — David Yi
*Assistant Examiner* — Craig S Goldschmidt
(74) *Attorney, Agent, or Firm* — Michael Best & Friedrich LLP

(57) ABSTRACT

A method for the coexistence of software having different safety levels in a multicore processor which has at least two processor cores (2, 3). A memory range (4, 5) is associated with each processor core (2, 3) and a plurality of software (SW1, SW2) is processed on one of the processor cores (2, 3) having a predefined safety level. The plurality of software (SW1, SW2) is processed having a predefined safety level only on the processor core (2, 3) with which the same safety level is associated, in which during the processing of the plurality of software (SW1, SW2), the processor core (2, 3) accesses only the protected memory range (4, 5) which is permanently associated with this processor core (2, 3).

16 Claims, 4 Drawing Sheets

(56) References Cited

U.S. PATENT DOCUMENTS

2008/0263256 A1* 10/2008 Gudeth ................ G06F 12/145
711/2
2012/0284732 A1* 11/2012 Griglock ............... G06F 9/5066
718/104
2014/0137181 A1* 5/2014 Christodorescu ....... G06F 21/53
726/1

* cited by examiner

METHOD FOR THE COEXISTENCE OF SOFTWARE HAVING DIFFERENT SAFETY LEVELS IN A MULTICORE PROCESSOR SYSTEM

BACKGROUND OF THE INVENTION

The present invention relates to a method for the coexistence of software having different safety levels in a multicore processor which includes at least two processor cores, wherein a memory range is associated with each processor core and the software is processed on one of the processor cores having a predefined safety level.

In the automobile industry, embedded systems are used in control units for controlling various processes, in which multicore microcontrollers are employed. These multicore microcontrollers include two or more processor cores. For safety-related applications, it is common to protect these processor cores via suitable hardware-based measures, for example, by protecting a processor core using a lockstep in the coupled processor core or using a redundant fault-tolerant CPU. In a lockstep pair of processor cores, two processor cores work synchronously, the same software running on both processor cores and a comparator comparing the results of each operation. If a disparity is detected, an error message is transmitted. However, as an active bus device, the lockstep pair appears as only one device. Such a pair is thus referred to as a protected processor core.

In addition, ISO 26262 is relevant to safety-related electronic systems in the automotive field. This standard introduces the term ASIL (automotive safety integrity level) and allows the classification of various systems, functions, and subfunctions according to their relevance to safety in the various safety levels (ASILs). These ASILs include QM, A, B, C, D (sorted in ascending order). If ASILs are used simultaneously in one computing system, for example, a microcomputer, a certain degree of independence, a so-called freedom from interference, is required between the different safety levels.

In safety-related applications, it is important to separate parts having different safety levels from each other in a simple form.

SUMMARY OF THE INVENTION

The object of the present invention is to provide a method for the coexistence of different safety levels in a multicore processor, in which system parts provided with different safety levels are separated from each other in a simple form in safety-related applications.

According to the present invention, the object is achieved in that the processor core which processes the software part, with which the protected memory range is associated, accesses this memory range, wherein an access of at least one of the additional processor cores of the multicore processor to this associated protected memory range is prevented. This has the advantage that only system parts communicate with each other which are associated with the same safety level. As a result, the system parts of the multicore microprocessor having different safety levels may be separated easily. Such an approach not only makes possible a best possible separation of these processor cores and memory units from each other, but also makes possible a separated development of the individual system parts. Because of this, an independence in the form of a freedom from interference is provided in such a multicore microprocessor system. This separation makes it possible to eliminate an erroneous effect of one system part of the multicore microprocessor on another system part of the multicore microprocessor with sufficient reliability.

A memory protection device configured between the processor cores and the memory ranges advantageously allows access to the protected memory range only to the processor core which has the same safety level and which is associated with this memory range. The basic idea is that only software having a given safety level runs on each processor core and that it is ensured that no processor core has access to the protected memory range of another processor core. Thus, software having an ASIL is present on each processor core. Systems having a safety level of ASIL QM, A, B, C, D may thus be implemented using five processor cores. This makes possible a freedom from interference argumentation in a generic form and thus the coexistence of different ASILs in a multicore microprocessor.

In one embodiment, the two-stage memory protection device makes possible an access by a processor core to the respective protected memory range via a hierarchical layer formed in the memory protection device. The memory protection device makes it possible to ensure via suitable programming that only certain bus masters have access to the selected protected memory ranges, i.e., that a given master never has access to certain memory ranges of the multicore processor, regardless of which software runs on it.

In one variant, during the start process of the multicore processor, the software checks whether only the processor core which is associated with the protected memory range has access to the protected memory range. As a result, it is ensured that the selected ranges which comprise a predefined safety level are separated from each other and are not affected by other components of the multicore microprocessor.

In one specific embodiment, to check the access to the protected memory range, a configuration is read out of the memory protection device or the memory protection device is reprogrammed by the software. Since the reprogramming is carried out only during the start process of the multicore processor, it is ensured that no change is made to the configuration during the operation of the multicore processor system in the case of access to the memory protection device by software having a different safety level.

In another variant, the reprogramming of the memory protection device is carried out statically. This means that following the programming procedure, it is no longer possible to change the programming, which is in particular ensured by the form of memory protection device used. However, based on this approach, at the time of starting the multicore microprocessor, it may be ensured via a software program having a predefined safety level that regardless of whether software having a different safety level runs on other processor cores included in the multicore processor system, this software having the different safety level is not able to access the range of the processor core which the software having the predefined safety level accesses. This also applies if additional software was loaded during the ongoing operation of the multicore processor unit.

In one specific embodiment, the configuration of the memory protection device allows the first processor core having a first safety level and a second processor core having a second safety level to have access to a third protected memory range. Such access is always of particular importance if the individual system parts of the multicore microprocessor such as the first and the second processor cores must communicate with each other when processing the software running on them having different safety levels.

Thus, an additional protected memory range is configured which both system parts are able to access. As a result, it is ensured that only this software and no other software components are also able to access the third protected memory range.

Advantageously, the first processor core accesses the first protected memory range while the second processor core simultaneously accesses the second protected memory range. Thus, it is possible to process the software having different safety levels in parallel on the various processor cores, thus accelerating the execution process due to the parallelizable memory access. In such a parallelizable memory access, there are no effects of the access between the first computing unit and the first protected memory range, and between the second computing unit and the second protected memory range. In order to ensure such a parallelizable access, for example, local memories having a direct connection to the processor core may be used, which allow a rapid access. In addition, a genuine parallel access may be made possible via crossbars. The use of dual ported memories provides another option. It is often also possible to approach parallelism by using caches or prefetch buffers. It is possible to improve the virtual parallelization in particular if prefetch buffers are time-controlled in such a way that the interconnect utilization runs without conflicts.

In another specific embodiment, a time management system prevents the simultaneous access by the first and the second processor cores to the protected third memory range. As a result, a simultaneous access of the first and the second processor cores to the protected third range is reliably prevented. By preventing an overlapping of two accesses, an interaction of the software running on the first or the second processor core is prevented. Thus, the freedom from interference condition is also ensured in this caxe.

This also applies in the case of a connection system which is not completely parallelizable, such as a bus or another interconnect system.

In the simplest form of such a time control, the time management system includes a schedule which determines the point in time at which the first and second processor cores access the protected third memory range. Thus, at a given point in time, one computing unit at most should have permission to access the protected third memory range. Such a time-based resource allocation concept, for example, is highly suitable for bus systems which are utilized in control units of motor vehicles, such as FlexRay, TTCAN, TTP/C. Thus, software conflicts are prevented during the access and freedom from interference is increased.

In another variant, to monitor the access of the first or second processor core to the protected third memory range, a log is produced in which the accesses of the processor cores to the third protected memory range are provided with a time stamp. With the aid of such a time stamp, it is very simple to identify the time sequence of the accesses and to determine whether an unintentional conflict has occurred involving an interaction of the software.

The processor core having a predefined safety level advantageously accesses only a protected peripheral element of the multicore microprocessor which is selected for processing during the processing of the software having the corresponding safety level. Such peripheral elements of the multicore microprocessor may, for example, be A/D converters, communication controllers, or timers. As a result of this determination, it is ensured that the same peripheral element of the multicore microprocessor is not used simultaneously by the system parts of the multicore microprocessor which are subjected to a safety level, and therefore no interaction, and thus no modification, of the software is possible. Thus, a freedom from interference is also made possible in this case, as a result of which configurations and destructive read accesses are prevented.

In one embodiment, the peripheral element is configured only during the start process of the multicore microprocessor. It is thus ensured that no software error is able to change the configuration of the peripheral element. Furthermore, such a software error having an influence on another application within the multicore microprocessor which uses the peripheral element is reliably prevented. Should an error be detected during the start process, an error signal may be output even before starting up the multicore microprocessor.

Depending on the form in which such protection from configuration changes is possible, it may in addition still be expedient to check the configuration of the peripheral element in read mode at predefined intervals. This may be carried out by a system part of the multicore microprocessor and constitutes an active protection from configuration errors.

In one refinement, during a download of a new software program onto the multicore processor, this software is run only on processor cores which have no association with a safety level and/or no access to the protected memory ranges. Thus, new and additional software may be loaded even during the operation of the multicore microprocessor without affecting the system parts of the multicore microprocessor being subject to a certain safety level.

BRIEF DESCRIPTION OF THE DRAWINGS

The present invention allows numerous specific embodiments, three of which are to be explained in greater detail based on the figures depicted in the drawings.

DETAILED DESCRIPTION

Figure 1:
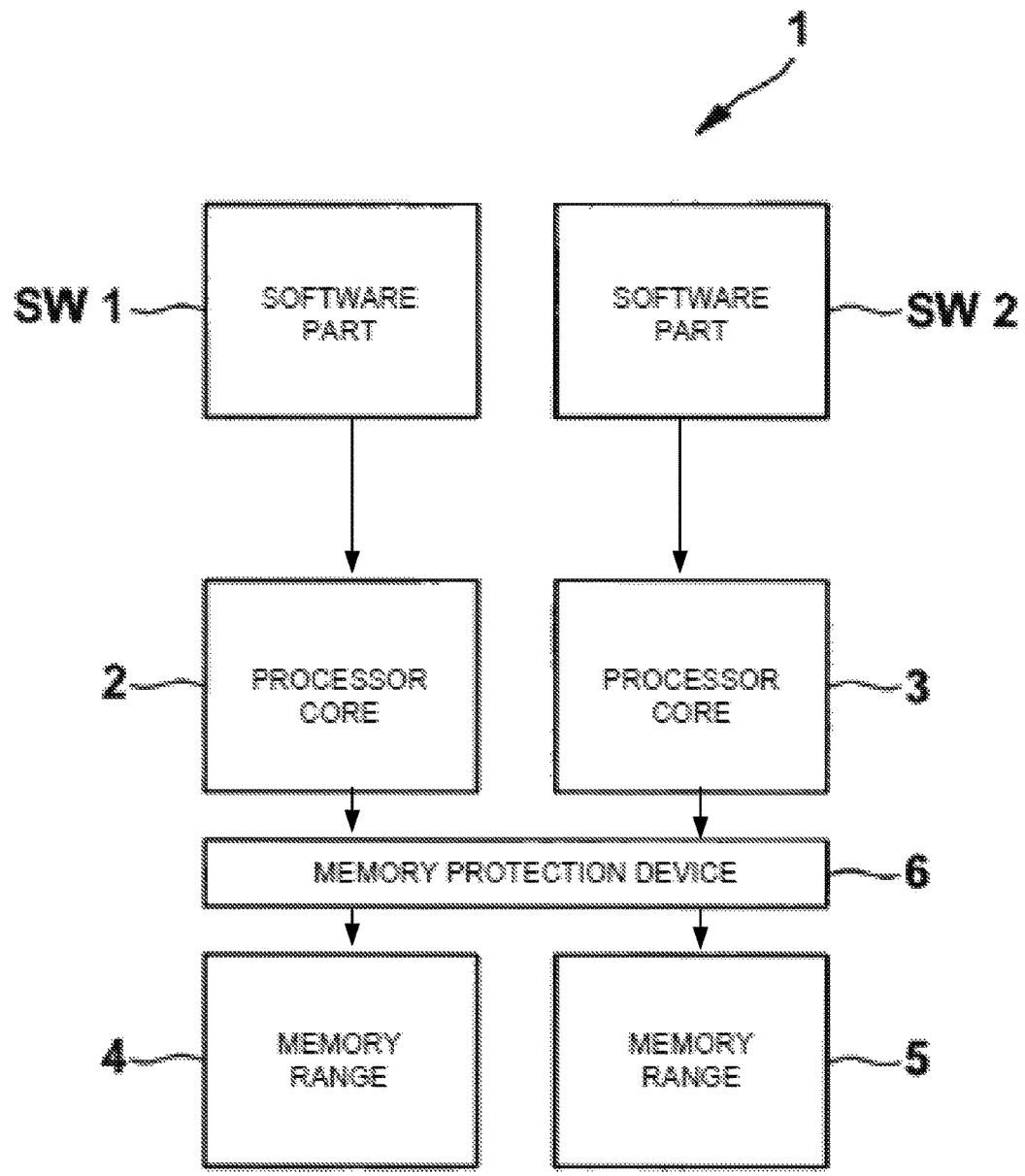
FIG. 1 shows a first exemplary embodiment of a multicore microprocessor according to the present invention.

Identical features are indicated by identical reference numerals.

FIG. 1 shows a first exemplary embodiment of a multicore microprocessor 1 which, for example, is used in embedded systems in control units of motor vehicles and includes two processor cores 2, 3. Memory range 4 is associated with processor core 2 and memory range 5 is associated with processor core 3. Both processor cores 2, 3 access memory ranges 4, 5 only via a corresponding memory protection device 6, which is designed as a memory protection unit (MPU). The access is carried out in particular via a corresponding second layer of the memory protection unit as described, for example, in EP 2 461 251 A1, for example, also via an additional safety MPU. Memory range 4 is accessible only by processor core 2, which means that processor core 3 is not allowed to access memory range 4. Correspondingly, processor core 3 is allowed to access only memory range 5, processor core 2 not being allowed to access memory range 5. It is conceivable that there are additional memory ranges which are not depicted which, however, both processor cores 2, 3 are able to access.

In control units of motor vehicles, software applications run having different safety levels. Such safety levels are identified in ASILs (automotive safety integrity levels). These applications are classified in ascending order according to their relevance to safety into the different ASILs representing safety levels, such as QM, A, B, C, D. For example, the following software applications may have corresponding ASILs:

ASIL D—control of the antilock braking system,
ASIL B—control of the injection system,
QM—climate control of the vehicle interior.

A software program SW1, for example, for controlling the antilock braking system of the motor vehicle, which has safety level D, is processed only on processor core 2, which is approved for safety level D. A second application in the form of software program SW2, for example, for the gasoline injection, has a safety level B. This software program SW2 is processed exclusively on processor core 3, which is approved for this safety level B. A freedom from interference, i.e., an absence of feedback between the two software applications, is implemented by software SW1 being run only on processor core 2 and software SW2 being run only on processor core 3.

Figure 2:
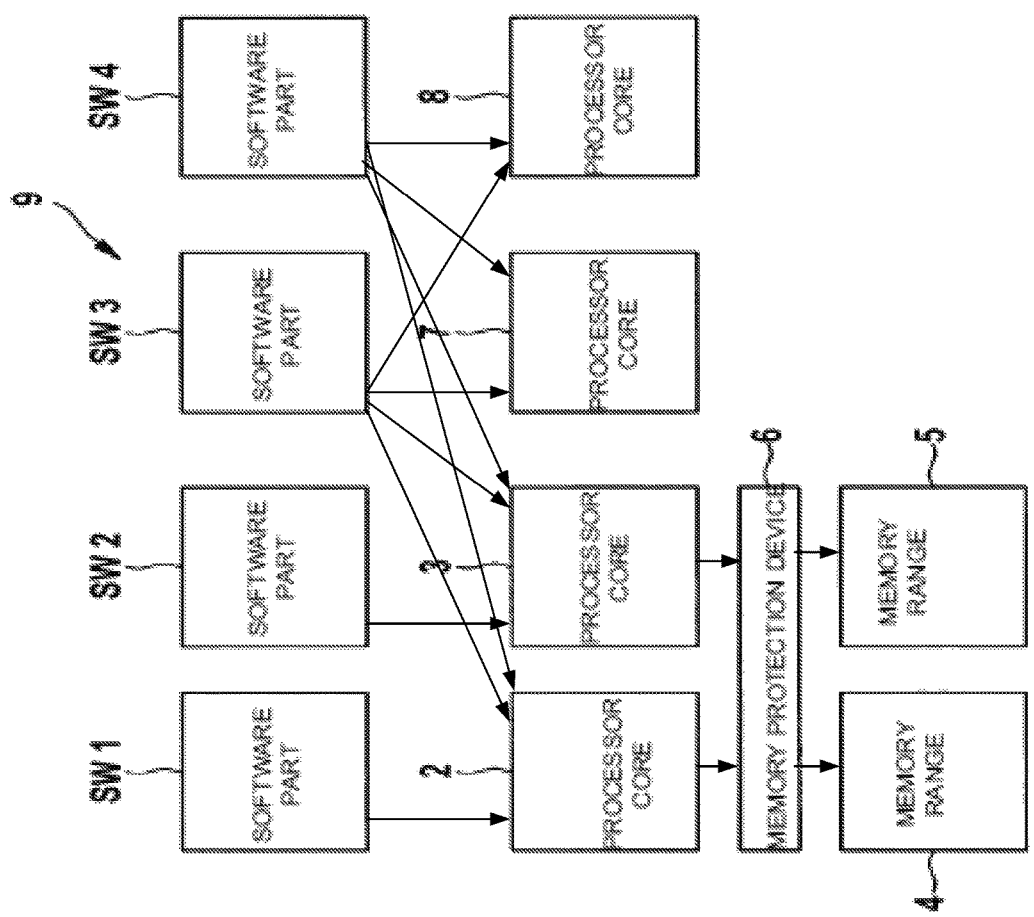
FIG. 2 shows a second exemplary embodiment of a multicore microprocessor according to the present invention.

FIG. 2 shows a second exemplary embodiment of multicore microprocessor 9 in which the multicore microprocessor is extended by processor cores 7 and 8. Software application SW3 and software application SW4 also run respectively on these processor cores 7 and 8. In this exemplary embodiment as well, the desired freedom from interference from all other software applications SW3, SW4 is then ensured for software SW1 and also SW2 if processing unit 2 processes only software SW1 and processing unit 3 processes only software SW2. In addition, it must be ensured that only processing unit 2 has access to memory range 4 and only processing unit 3 has access to memory range 5. If this is ensured for processor cores 2, 3 by the use of aforementioned memory protection device 6, then variable, in the worst case dynamically downloaded software, is not able to change this property of multicore microprocessor 9, so that the freedom from interference conditions are ensured even for all cases. There are no requirements for software applications SW3 and SW4 to be associated with a certain processing unit. They may generally be distributed in any manner to processing units 2, 3, 7, or 8.

In order to ensure that processor cores 3, 7, 8 have no access to particularly protected memory range 4, software SW1 reads out the configuration of memory protection device 6 during a boot or start process and evaluates it. However, there is also the possibility that the configuration of memory protection device 6 is programmed by software SW1 during the boot or start process itself. In this case, it must only be ensured that this programming is static, i.e., that no other changes are able be made to the configuration after the boot process. Thus, at the start time of software SW1, it is ensured that regardless of which software SW2, SW3, SW4 is running on other processor cores 3, 7, 8, this software SW2, SW3, SW4 is not able to access memory range 4. This applies even if this software SW2, SW3, SW4 is loaded during ongoing operation. The precondition for this is that the loaded software does not run on processor core 2, but on one of the other processor cores 3, 7, or 8.

Figure 3:
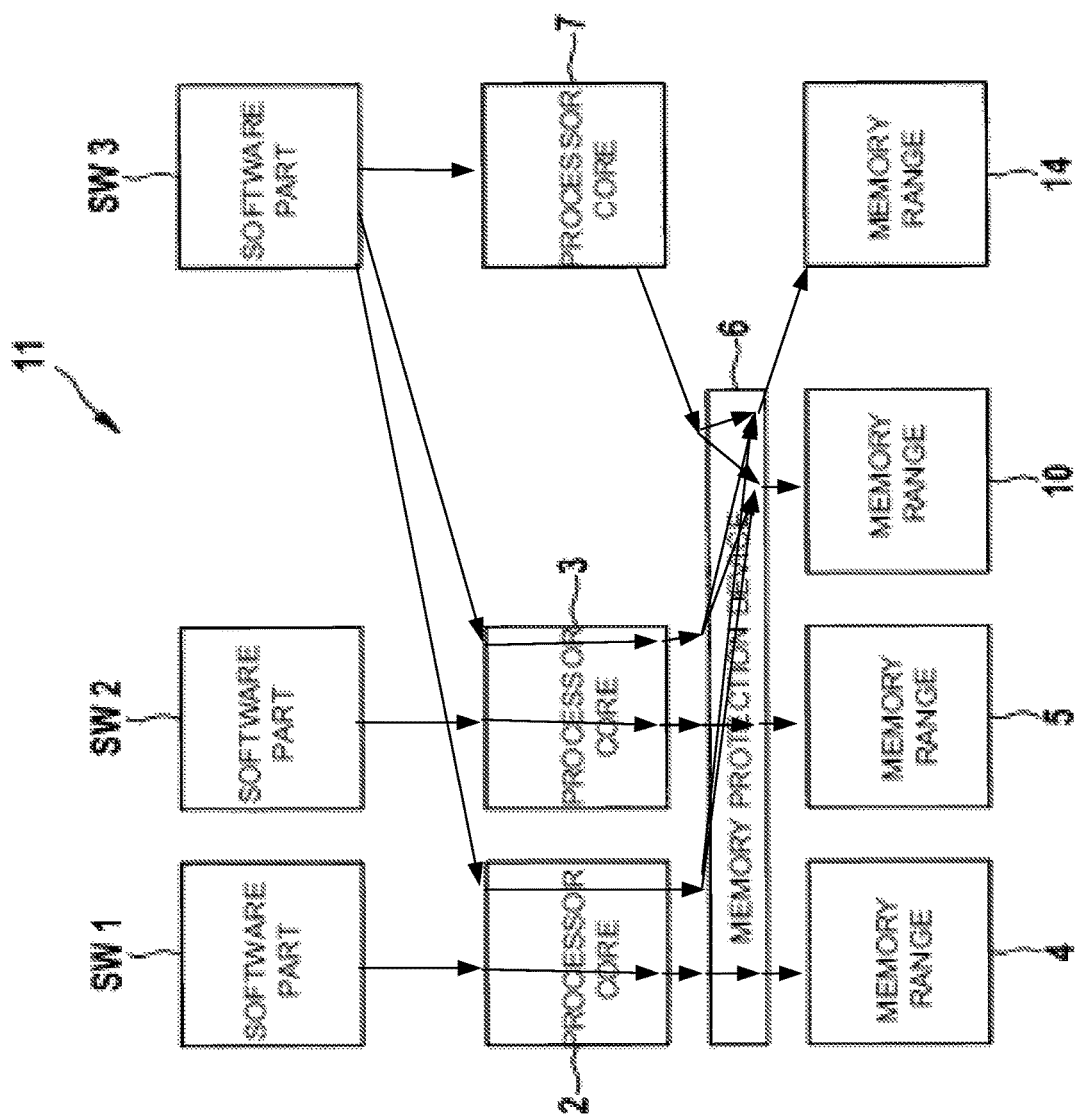
FIG. 3 shows a third exemplary embodiment of a multicore microprocessor according to the present invention.

In use cases, it frequently occurs that different software applications must communicate with each other during processing. In order to ensure this also in the described configuration of multicore microprocessor 11, a memory range 10 is introduced as shown in FIG. 3, to which both processor core 2 and processor core 3 have access via memory protection device 6. Memory protection device 6 is configured in such a way that only processor core 2 has access to memory range 4, only processor core 3 has access to memory range 5, and only processor cores 2 and 3 have access to memory range 10. In this case, regardless of how many other processor cores 7 are present in microprocessor system 11 and which software applications run on them, it is ensured that there is no possibility of influence by other software applications, other processing units, and other memory ranges.

In order to achieve a freedom from interference also in the case of access of processor core 2 or processor core 3 to memory range 10, certain basic timing conditions are set and monitored as necessary. If it is ensured that the accesses to a memory range, a memory location, an interconnect, or another source/address do not overlap, an access conflict may be prevented. In order to achieve this, a schedule is introduced in which the point in time at which processor core 2 is able to access memory range 10 and the point in time at which processor core 3 is able to access memory range 10 are stored. It is thus ensured that only one processor core 2, 3 is ever allowed to access memory range 10.

It is possible to monitor this kind of distribution, for example, by integrating the check program into a bus protocol or by monitoring it for conflicts. This may take place, for example, by logging the conflict by, for example, adding a suitable piece of data. Such a log may, for example, include the following components:

The current operator of the bus is recorded by the bus master and the software component being stored in the form of task M or operating system Y.

A time stamp is stored.

This information is saved and is advantageously stored in a FIFO memory having a finite length. In the case of certain events such as conflicts, this FIFO memory is copied, possibly together with information about the other system part requesting access.

The conflicts are evaluated by a suitable check program. In the case of critical conflicts, a safe system state is established.

However, there are also more complex interference options when exchanging information. If, for example, a piece of data to be exchanged which lies in memory range 10 is not correctly delivered with respect to time or content due to an error or a particular property of a software application, for example, of software SW1 in FIG. 3, then this error may affect software SW2 via this exchange. To handle such time-related problems, it is also possible to add time information, for example, cycle counters or time stamps to the piece of data. The correctness of this time information may then also be monitored during the read operation. For example, it may be checked whether the piece of data is provided with the correct cycle counter. In the case of a time stamp, it is checked whether the correct "age" is present, for example, "maximum 10 ms old". In the case of a suitable distribution of the software applications, this monitoring may then possibly be carried out by an operating system service or a basic software component which is application-independent and only configured suitably.

Figure 4:
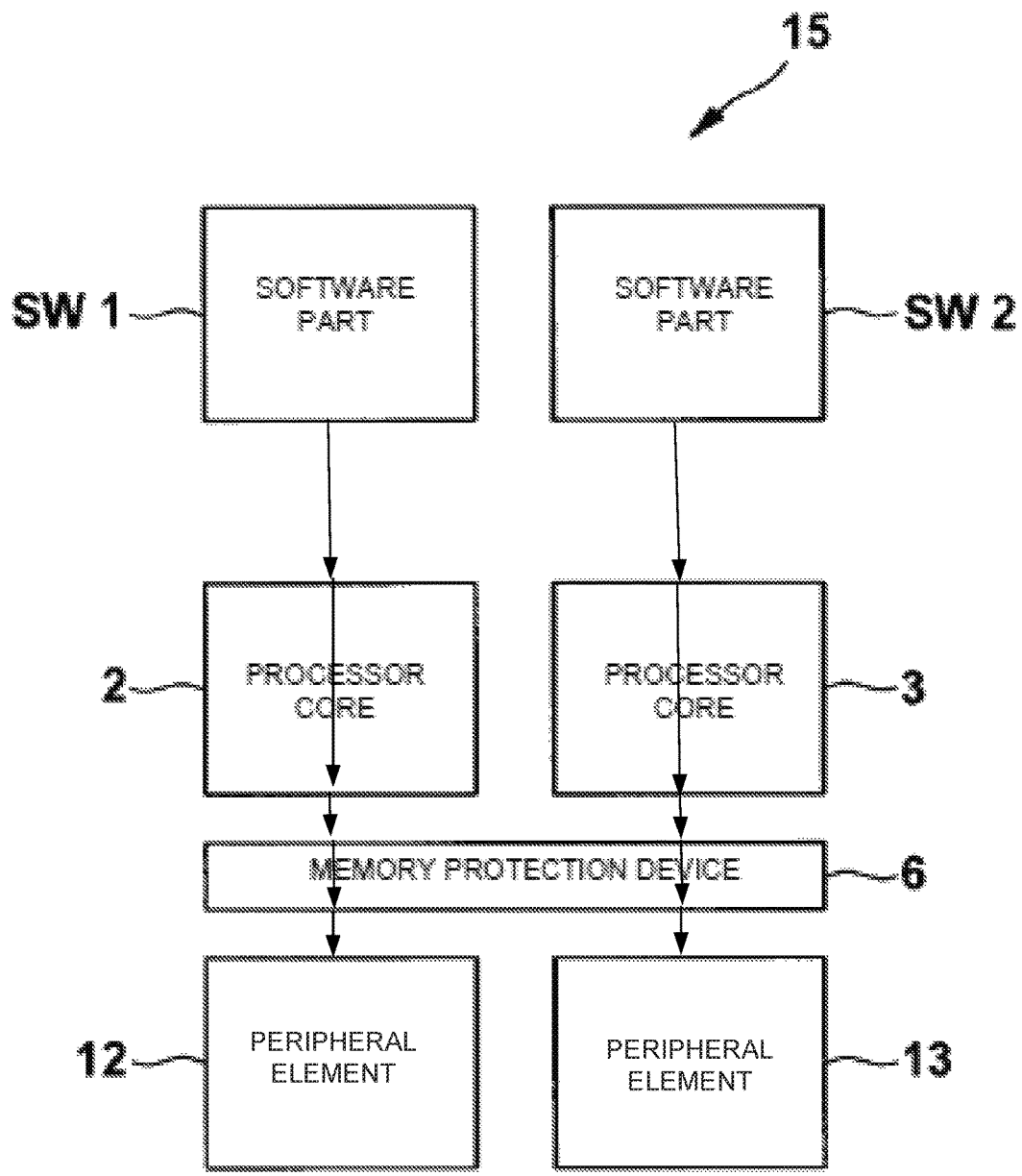
FIG. 4 shows a fourth exemplary embodiment of a multicore microprocessor according to the present invention.

The same mechanisms which are applicable to the access to a shared memory range may also be used for shared peripheral elements, for example, A/D converters, communications controllers, or timers, etc. (FIG. 4). This may be achieved by peripheral element 12, 13 being able to be configured only during a boot process. Subsequently, an application may be configured for peripheral element 12, 13, in which other system parts of multicore microprocessor 15 read the configuration, and if everything is in order, a correct configuration during operation is assumed. If a correct configuration has not been carried out, an error message is provided when multicore microprocessor 15 starts. Depending on the form in which such protection from configuration changes is set, it may also be expedient for the configuration of peripheral element 12, 13 to be checked periodically in read mode. This may be carried out by any software application SW and constitutes an active protection from configuration errors.

If a new or additional software application SW is to be downloaded to the multicore microprocessor of a control unit, it is advisable to maintain the following basic conditions.

- The software application which is already available, which is to be protected from interference by downloaded software applications, is distributed to a fixed subset of the processor cores and uses a permanently defined memory range.
- The newly downloaded software application is run only on other processor cores.
- The memory protection device is configured in such a way that none of the other processor cores receives write access to the permanently defined memory range.
- In the optimal case, the memory accesses are fully parallelizable.

The invention claimed is:

1. A method for the coexistence of software having different safety levels in a multicore processor which includes at least two processor cores and a plurality of memory ranges, the method comprising:
    associating a memory range with a processor core and a plurality of software parts,
    assigning one of a plurality of predefined safety levels to each processor core,
    assigning one of the plurality of predefined safety levels to each software part,
    processing each software part on one of the processor cores,
    processing a first software part on the processor core associated with the memory range, the processor accessing the memory range wherein a protected memory range is associated with the memory range, wherein the safety level associated with said processor core corresponds to the safety level associated with the first software part,
    preventing access to the protected memory range by an additional processor core;
    checking by the first software, during a start process of the multicore processor, whether only the processor core which is associated with the protected memory range has access to the protected range;
    running a new software application, during a download of the new software application, only on processor cores which have no association with the safety level associated with the protected memory range and/or on processor cores having no access to the protected memory range.

2. The method according to claim 1, characterized in that a memory protection device configured between the processor cores and the plurality of memory ranges allows access to the memory range only to the processor core which is associated with the protected memory range.

3. The method according to claim 2, characterized in that memory protection device is a two-stage memory protection device and the two-stage memory protection device makes possible an access by a processor core to the respective protected memory range via a hierarchical layer formed in the memory protection device.

4. The method according to claim 1, characterized in that, to check the access to the protected memory range, a configuration is read out of the memory protection device.

5. The method according to claim 1, characterized in that, to set the access to the protected memory range, the memory protection device is reprogrammed by the software.

6. The method according to claim 5, characterized in that the reprogramming of the memory protection device is carried out statically.

7. The method according to claim 2, characterized in that the configuration of the memory protection device allows the first processor core having a first safety level and a second processor core having a second safety level to have an access to a third protected memory range.

8. The method according to claim 1, characterized in that while the processor core accesses the protected memory range, a second processor core simultaneously accesses a second protected memory range.

9. The method according to claim 7, characterized in that a time management system prevents simultaneous access by the first processor core and the second processor core to the protected third memory range.

10. The method according to claim 9, characterized in that the time management system includes a schedule which determines a point in time at which the processor core and the second processor core access the protected third memory range.

11. The method according to claim 9, characterized in that to monitor the access of the first processor core or second processor core to the protected third memory range, a log is produced in which the accesses by the processor core and the second processor core to the third protected memory range are logged.

12. The method according to claim 1, characterized in that a processor core having a predefined safety level accesses a protected peripheral element of the multicore processor which is selected for processing during the processing of the plurality of software which have a corresponding safety level.

13. The method according to claim 12, characterized in that the peripheral element is configured only during the start process of the multicore processor.

14. The method according to claim 12, characterized in that a configuration of the peripheral element is checked in read mode at predefined intervals.

15. The method according to claim 1, characterized in that during a download of a new software application, the new software application is run only on processor cores which have no association with a safety level.

16. The method according to claim 1, characterized in that during a download of a new software application, the new software application is run only on processor cores which have no access to the protected memory range.

* * * * *